United States Patent
Buehler et al.

(10) Patent No.: US 7,882,544 B2
(45) Date of Patent: Feb. 1, 2011

(54) INHERITED ROLE-BASED ACCESS CONTROL SYSTEM, METHOD AND PROGRAM PRODUCT

(75) Inventors: Dieter Buehler, Tuebingen (DE); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 10/889,625

(22) Filed: Jul. 12, 2004

(65) Prior Publication Data

US 2006/0010483 A1   Jan. 12, 2006

(51) Int. Cl.
  *G06F 17/30* (2006.01)
  *G06F 15/167* (2006.01)
  *G06F 7/00* (2006.01)
  *H04L 29/06* (2006.01)

(52) U.S. Cl. .................. 726/4; 726/28; 726/29; 726/30; 709/119; 707/785; 707/786

(58) Field of Classification Search .............. 726/1, 726/2, 27–30
See application file for complete search history.

(56) References Cited

U.S. PATENT DOCUMENTS

| | | | |
|---|---|---|---|
| 5,715,403 A * | 2/1998 | Stefik | 705/44 |
| 5,878,415 A * | 3/1999 | Olds | 707/9 |
| 5,911,143 A * | 6/1999 | Deinhart et al. | 707/103 R |
| 6,023,765 A | 2/2000 | Kuhn | |
| 6,950,825 B2 * | 9/2005 | Chang et al. | 707/100 |
| 7,058,648 B1 * | 6/2006 | Lightfoot et al. | 707/102 |
| 2001/0019614 A1 * | 9/2001 | Madoukh | 380/277 |
| 2002/0026592 A1 | 2/2002 | Gavrila et al. | |
| 2002/0062240 A1 * | 5/2002 | Morinville | 705/8 |
| 2003/0037263 A1 * | 2/2003 | Kamat et al. | 713/202 |
| 2003/0115196 A1 | 6/2003 | Boreham et al. | |
| 2003/0188198 A1 * | 10/2003 | Holdsworth et al. | 713/201 |
| 2003/0229623 A1 | 12/2003 | Chang et al. | |

\* cited by examiner

*Primary Examiner*—Nasser Moazzami
*Assistant Examiner*—Fatoumata Traore
(74) *Attorney, Agent, or Firm*—Jeffrey T. Hofman

(57) ABSTRACT

Under the present invention, role types are defined by association with certain permissible actions. Once defined in this manner, a role type can then be bound to "nodes" of a hierarchical tree that represent computer-based resources such as dynamic object spaces. Once bound to a node, instances of this role type are created that will be inherited by hierarchical descendants of that node unless a role type block (e.g., inheritance or propagation) has been established for the corresponding role type. The present invention also allows the computer-based resources to be defined as virtual or private. Virtual resources represent general protected concepts in the system instead of computer-based resources and are subject to be bound with roles, while private resources are not. That is, the private resources remain the "property" of the creating user or group.

21 Claims, 2 Drawing Sheets

INHERITED ROLE-BASED ACCESS CONTROL SYSTEM, METHOD AND PROGRAM PRODUCT

BACKGROUND OF THE INVENTION

1. Field of the Invention

The present invention generally provides an inherited role-based access control system, method and program product.

2. Related Art

As the use of computer networks becomes more pervasive, organizations are increasingly seeking better ways to implement access control for their computer-based resources (e.g., servers, storage spaces, etc.). Access control can not only help prevent those outside of the organization from accessing the resources, but can also be used to limit access by internal personnel.

Traditionally, access control has been provided through the use of access control lists (ACLs), whereby users are associated with specific permissions to access or interact with various resources. To this extent, an ACL is typically viewed as a person-by-person or group-by-group enumeration of permissions. Unfortunately, whenever a permission within an ACL changes, the ACL must be recreated with the changed permission. As such, configuring or changing an ACL is not an easy process. This is especially the case where finely grained control over the permission levels is desired, such as when resources are arranged as a hierarchical tree of nodes. Specifically, when resources are arranged hierarchically, it could be desired for a person or group to have a certain set of permissions for one set of nodes, while having an entirely different set of permissions for another set of nodes. An ACL-based approach generally requires the permissions for each user or group be specified for each node within the ACL. This can make creating and/or maintaining the ACL an extremely complex task.

These problems are especially apparent if permissions are desired to be inherited through a chain of descendants in the hierarchy. For example, it could be the case that permissions assigned to one node are desired to be inherited by hierarchical descendants of that node. An ACL-based approach would require the permissions to be specifically enumerated for each node. Although various solutions have been suggested for attempting to provide inherited permissions, no existing solution provides an easy way to provide finely grained control over the inheritance concept. For example, if node "X" has two child nodes "Y" and "Z," it could be desired for some combinations of permissions (so-called role types) assigned to node "X" to be inherited by node "Y" but not node "Z" and for some other combinations to be inherited by both nodes "Y" and "Z." The existing solutions either require the permissions to be specifically enumerated, or a complex set of rules to be developed. In any event, no existing solution provides an easy way to express finely grained control over a hierarchy of resources.

In view of the foregoing, there exists a need for an inherited role-based access control system, method and program product. Specifically, a need exists for a system in which particular generic actions can be associated with certain role types. A further need exists for a system that allows role instances of specific role types to be bound to nodes of a hierarchical tree that correspond to computer-based resources. Still yet, a need exists for the role instances to be inherited by hierarchical descendants of the nodes to which they have been bound, unless a role-based block has been established for the corresponding type of role.

SUMMARY OF THE INVENTION

In general, the present invention provides an inherited role-based access control system, method and program product. Specifically, under the present invention, role types are defined by association with certain permissible actions. Once defined in this manner, a role type can then be bound to "nodes" of a hierarchical tree that represent computer-based resources such as dynamic object spaces. Once bound to a node, instances of this role type are created that will be inherited by hierarchical descendants of that node unless an inheritance or propagation block has been established for the corresponding role type. The present invention also allows the computer-based resources to be defined as virtual or private. Virtual resources represent general protected concepts in the system instead of computer-based resources and are subject to be bound with roles, while private resources are not. That is, the private resources remain the "property" of the creating user or group.

A first aspect of the present invention provides an inherited role-based access control system, comprising: a role definition system for defining a set of permissible actions for a role type; a role binding system for binding the role type to a node of a hierarchical tree of nodes, wherein the nodes represent computer-based resources, and wherein instances of the role type are inherited by hierarchical descendants of the node; and a role blocking system for establishing a role type block for the role type, wherein the role type block limits inheritance of the instances of the role type.

A second aspect of the present invention provides an inherited role-based access control method, comprising: providing a hierarchical tree of nodes, wherein the nodes represent computer-based resources; binding a role type to a node of the hierarchical tree to create a role-based domain, wherein instances of the role type are inherited by hierarchical descendants of the node; and establishing a role type block for the role type, wherein the role type block limits inheritance of the instances of the role type.

A third aspect of the present invention provides a program product stored on a recordable medium for inherited role-based access control, which when executed, comprises: program code for defining a set of permissible actions for a role type; program code for binding the role type to a node of a hierarchical tree of nodes, wherein the nodes represent computer-based resources, and wherein instances of the role type are inherited by hierarchical descendants of the node; and program code for establishing a role type block for the role type, wherein the role type block limits inheritance of the instances of the role type.

A fourth aspect of the present invention provides a system for deploying an application for inherited role-based access control comprising: a computer infrastructure being operable to: define a set of permissible actions for a role type; bind the role type to a node of a hierarchical tree of nodes, wherein the nodes represent computer-based resources, and wherein instances of the role type are inherited by hierarchical descendants of the node; and establish a role type block for the role type, wherein the role type block limits inheritance of the instances of the role type A fifth aspect of the present invention provides computer software embodied in a propagated signal for inherited role-based access control, the computer software comprising instructions to cause a computer system to perform the following functions: define a set of permissible actions for a role type; bind the role type to a node of a hierarchical tree of nodes, wherein the nodes represent computer-based resources, and wherein instances of the role type are inherited by hierarchical descendants of the node; and establish a role type block for the role type, wherein the role type block limits inheritance of the instances of the role type.

BRIEF DESCRIPTION OF THE DRAWINGS

These and other features of this invention will be more readily understood from the following detailed description of the various aspects of the invention taken in conjunction with the accompanying drawings in which.

Figure 1:
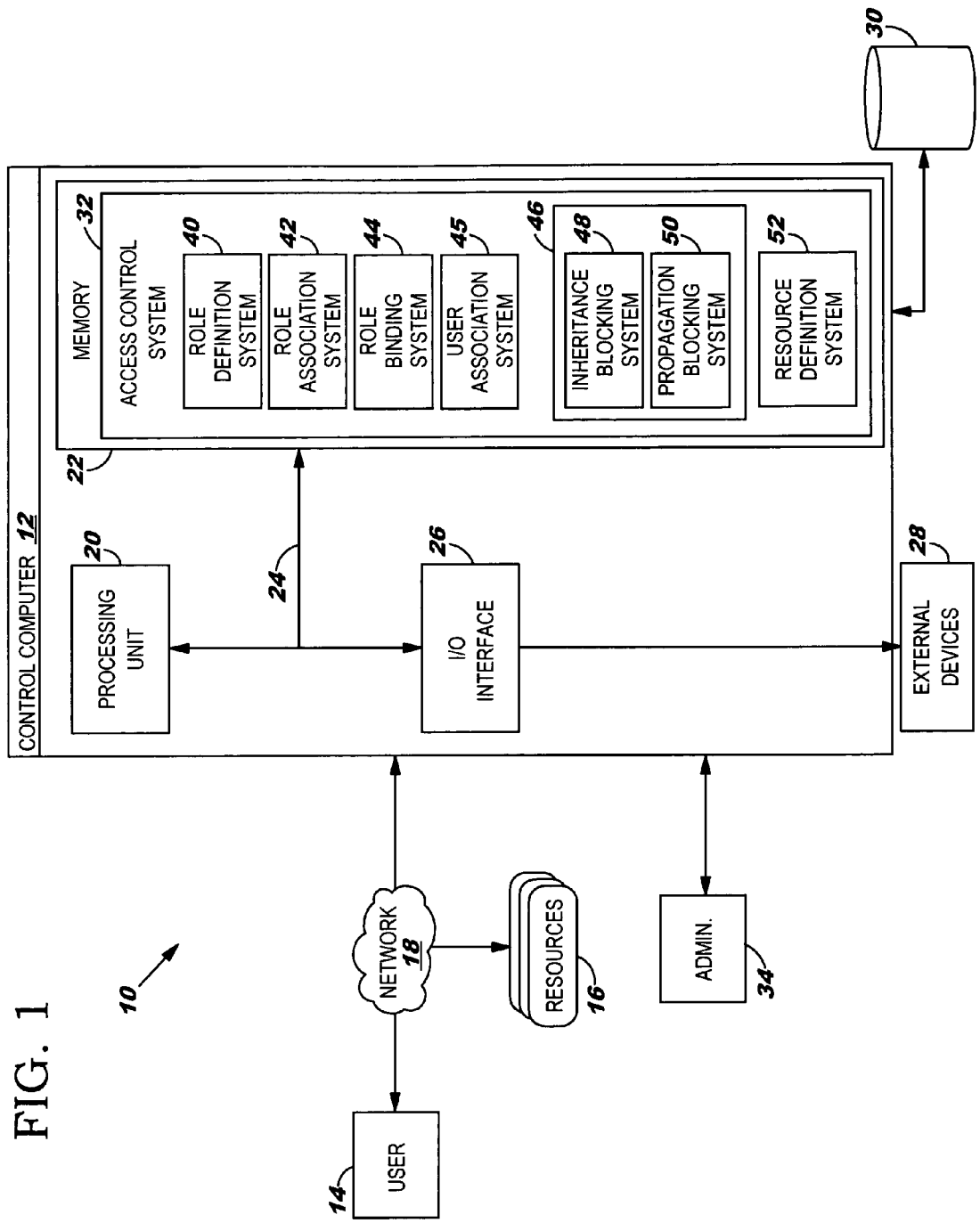
FIG. 1 depicts an inherited role-base access control system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides an inherited role-based access control system, method and program product. Specifically, under the present invention, role types are defined by association with certain permissible actions. Once defined in this manner, a role type can then be bound to "nodes" of a hierarchical tree that represent computer-based resources such as dynamic object spaces. Once bound to a node, instances of this role type are created that will be inherited by hierarchical descendants of that node unless a role type block (e.g., inheritance or propagation) has been established for the corresponding role type. The present invention also allows the computer-based resources to be defined as virtual or private. Virtual resources represent general protected concepts in the system instead of computer-based resources and are subject to be bound with roles, while private resources are not. That is, the private resources remain the "property" of the creating user or group.

Referring now to FIG. 1, an inherited role based access control system 10 according to the present invention is shown. As shown, system 10 includes a control computer 12 that provides access control for computer-based resources (resources) 16. In general, resources 16 are intended to represent any type of computerized resources within a computer infrastructure that a user 14 or a group of users may attempt to access or otherwise interact with. For example, resources 16 could include dynamic object (storage) spaces, software components, hardware components, etc. Moreover, user 14 is intended to represent an internal or external user that wishes to gain access to or interact with one or more resources 16. For example, user 14 could be an employee of an entity that owns or controls resources 16 (and the computer infrastructure in which resources 16 reside). Alternatively, user 14 could be an individual outside of the entity that owns or controls resources 16. Similarly, control computer 12 could be owned, deployed, maintained and/or operated by the entity that owns resources 16, and used to control access thereto. To this extent, both control computer 12 and resources 16 could exist as part of larger computer infrastructure of the entity. Alternatively, as will be further described below, control computer 12 could be deployed, maintained, supported, and/or operated by an entity that is independent of the entity that owns resources 16 (i.e., a service provider). Regardless, control computer 12 is intended to represent any type of computerized system capable of carrying out the functions of the present invention. For example, control computer 12 could be a server, a workstation, a desktop computer, a laptop computer, a handheld device, etc.

As further depicted in FIG. 1, computer 12, user 14 and resources 16 are typically interconnected over a network 18, which may or may not be part of the computer infrastructure in which resources 16 reside. To this extent, network 18 is intended to represent any type of network such as the Internet, a local area network (LAN), a wide area network (WAN), a virtual private network (VPN), etc. As such, communication through network 18 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional IP-based protocol. In this instance, an Internet service provider could be used to establish interconnectivity. In any event, as will be described in conjunction with FIG. 2 below, resources 16 are typically arranged into a hierarchical tree of nodes under the present invention.

Control computer 12 generally includes processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, etc. Moreover, similar to processing unit 20, memory 22 may reside at a single physical location, comprising one or more types of data storage.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in control computer 12 and likewise may comprise any known type of transmission link, including electrical, optical, wireless, etc.

Storage unit 30 can be any system (e.g., a database, etc.) capable of providing storage for information under the present invention. Such information could include, among other things, actions, defined roles, associations of roles with resources types, bindings of roles to resources/nodes, blocks, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into control computer 12.

Shown in memory 22 of control computer 12 is access control system 32. As will be further described below, access control system 32 provides for an easy way to establish finely grained control over resources 16. As depicted, access control system 32 includes role definition system 40, role association system 42, role binding system 44, user association system 45, role blocking system 46 (having inheritance blocking system 48 and propagation blocking system 50), and resource definition system 52. As mentioned above, resources 16 are typically represented as a hierarchical tree of nodes under the present invention. To this extent, such a hierarchical representation can be provided to control computer 12 (e.g., stored in storage unit 30), or alternatively, access control system 32 could further include a "representation system" (not shown) that analyze resources 16 and builds a corresponding hierarchical tree representation.

Figure 2:
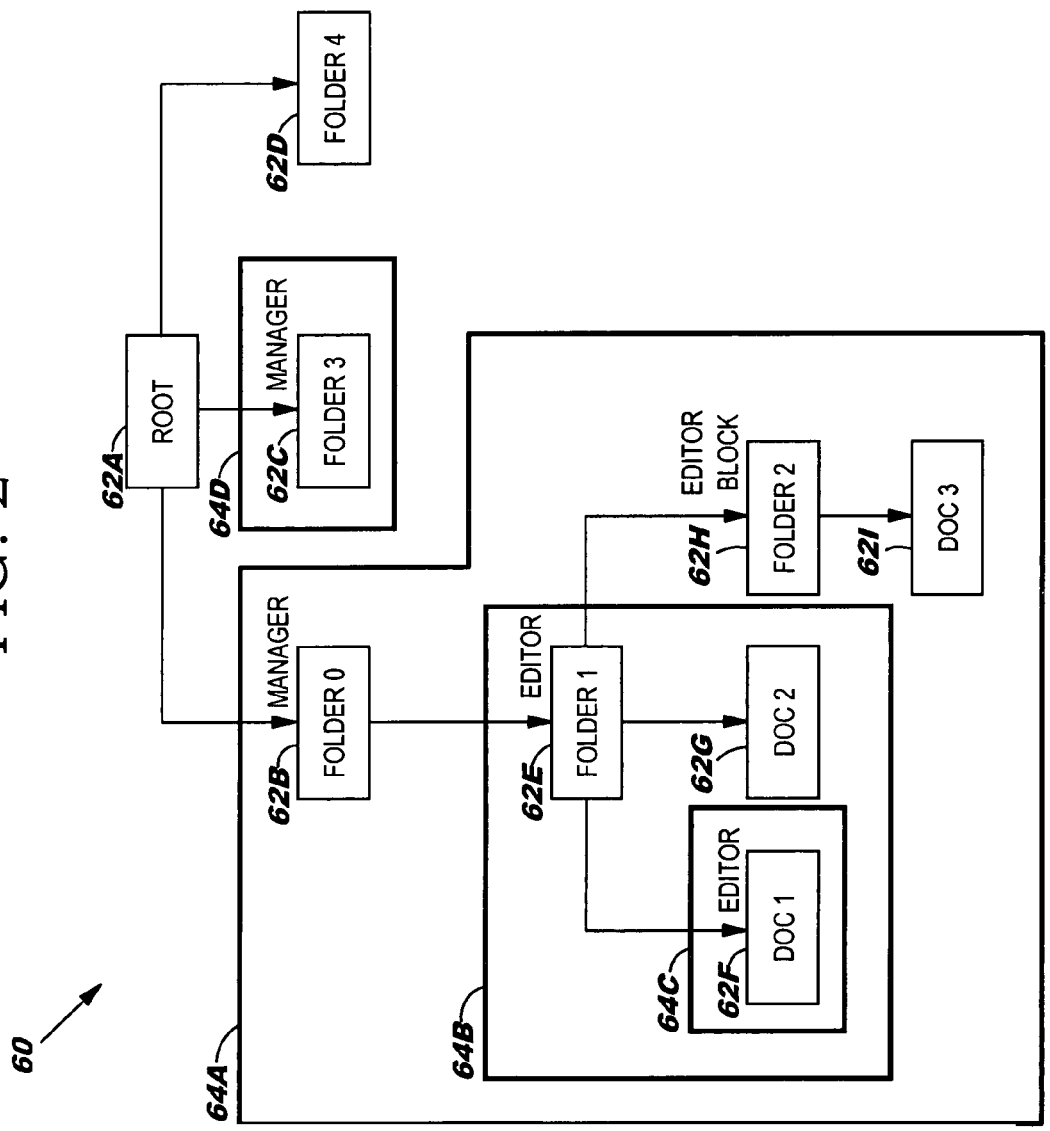
FIG. 2 depicts an illustrative hierarchical tree of nodes that represent computer-based resources according to the present invention.

Regardless, referring to FIG. 2, an illustrative hierarchical tree 60 is shown. In general, nodes 62A-I of tree 60 each represent (e.g., correspond to) a resource 16 of FIG. 1. In the illustrative tree 60 shown, the resources are to object spaces (although this need not be the case). For example, nodes 62A, 62B, 62C, 62D, 62E and 62H correspond to electronic/virtual storage folders, while nodes 62F, 62G and 62I correspond to actual electronic documents.

Referring to FIGS. 1 and 2 collectively, the functions of the present invention will be explained in greater detail. In order for access control under the present invention to be provided, a role type will first be defined via role definition system 40. In general, a role type is defined based on a set of actions that are permitted to be carried out by a user or group of users assigned to role instances of that role type. Typically, the set of actions defined for a role type are drawn from a larger body of generic actions. For example, assume that with respect to resources 16, there are twenty possible actions that can be taken. A particular role type might only be assigned four of the twenty actions. For example, a "Manager" role type might contain actions that imply being able to read data objects from an object space and write new objects to an object space, while not containing actions that would imply being permitted to edit existing data objects. Conversely, an "Editor" role might be able to read, write and edit data objects. In a typical embodiment, role types can be defined via role definition system 40 by an administrator 34 or the like.

Once role types have been defined, they can be assigned/bound to specific nodes of tree 60. In general, the binding of role types to nodes can be a multi-step operation. First, role association system 42 can be used (e.g., by administrator 34) to set forth the "rules" or "conditions" under which roles can be bound to nodes. Specifically, role association system 42 can be used to associate role types with certain types of resources. Once such associations are made, a role type can only be bound to a node if its corresponding resource is of a type that was configured to be applicable for the given role type. For example, if the "Manager" role type is only applicable for the "Folder" resource type, the "Manager" role type can only be bound to nodes of tree 60 that are of the "Folder" type (e.g., nodes 62E and 62H). Role types can be made applicable to many resource types in this manner.

In any event, once any desired associations have been made, role binding system 44 can then be used (e.g., by administrator 34) to bind the role types to the nodes of tree 60. The binding of a role type to nodes in this manner thus creates a Cartesian Product of the actions contained in the role type and the resources to which the roles are bound. The resulting tuples consisting of one action and one resource each are called permission. Thus, role instances are sets of permissions.

As shown in FIG. 2, the "Manager" role type has been bound to nodes 62B-C, while the "Editor" role type has been bound to nodes 62E-F. Under the present invention, when a role type is bound to a node in tree 60, instances of that role type and the permissible actions therefor will be inherited by all hierarchical descendants, unless a role type block has been established as will be further discussed below. Thus, for example, the "Manager" role type bound to node 62B will be inherited by nodes 62E-I.

As further shown in FIG. 2, the concept of binding role types to nodes and role inheritance under the present invention leads to the creation of role "domains." A role domain is defined by the nodes to which a role type has been bound or inherited. Under the bindings shown in FIG. 2, four separate domains have been created, namely, domains 64A-D. Domain 64A includes nodes 62B and 62E-I, and is defined by the binding of the "Manager" role type to node 62B. As further shown in FIG. 2, the "Editor" role type has been assigned to both nodes 62E-F. This leads to the creation of two separate domains. Domain 64B encompasses nodes 62E-G, while domain 64C encompasses only node 62F. If node 62F had any hierarchical descendants, both domains 64B-C would include those hierarchical descendants. As further shown, domains can overlap under the present invention (see e.g., the overlapping of domains 64A-C).

In any event, after instances of role types have been inherited as described above, user association system 45 can be used to assign individual users or user groups to individual instances. Such assignments will grant all the permissions contained in the given role type instance to the specified user or user group. Accordingly, the set of permissions granted to a specific user will be defined by the super set of all permissions contained in all role type instances assigned either directly to the given user, or to any group of which the given user is a member.

As indicated above, instances of role types are inherited under the present invention unless a role type block has been established. To this extent, role blocking system 46 is provided in FIG. 1. In general, there are at least two types of blocks that can be established (e.g., by administrator 34) under the present invention. A first type of block is referred to herein as an inheritance block, and can be established by administrator 34 via inheritance blocking system 48. In general, an inheritance block will prevent specific role types from being inherited by a node to which it is applied. For example, assume that an inheritance block for the "Editor" role type has been established on node 62H (as depicted in FIG. 2). In this case the "Editor" role type bound to node 62E will not be inherited by nodes 62H or 62I. However, it will still be inherited by nodes 62F-G. This inheritance block for the "Editor" role type does not affect instances of other role types. Thus, instances of the "Manager" role type bound to 62B will still be inherited by nodes 62H-I.

A second type of block is referred to herein as a propagation block, and is established by administrator 34 via propagation blocking system 50. When established under the present invention, a propagation block on a node disengages (i.e., turns-off) inheritance feature for a given role type for any subtree having that node as its root. That is, when a propagation block is established for a node, the corresponding role type will still be inherited by the node itself but not by hierarchical descendants thereof. For example, if a propagation block was established for node 62E for the "Manager" role type, an instance of the "Manager" role type bound to 62B would still be inherited by node 62E but not by nodes 62F-I.

The blocks available under the present invention thus provide an easy way to establish finely grained control over access to the resources 16. No other system allows access to be controlled in such a manner without the use of a complex rule set or "negative" roles.

As further shown in FIG. 1, access control system 32 includes resource definition system 52, which allows resources 16 to be defined as "virtual" or "private." In general, a virtual resource is one that is available to other users and hence subject to the role binding, inheritance and/or blocking of the present invention. A private resource is one that is not so subject and thus remains "private" to the user/group that created or owns the resource. For example, assume that user 14 created "DOC 3," which is represented by node 62I. Further assume that user 14 wished "DOC 3" to be a private resource. In such a case, user 14 or administrator 34 could use resource definition system 52 to ensure that "DOC 3" is defined as a private resource. As a private resource, a role type could not be bound to or inherited by node 62I. This concept further provides a finely grained level of access control that is easy to implement and manage. It should be appreciated, however, that the definition of a resource of virtual or private can be an automatic process under the present invention that does not require manual intervention by administrator 34 or anyone else. For example, role definition system 52 could be configured to automatically designate a new resource as virtual or private. Alternatively, role definition system 52 could access a set of rules or the like (e.g., in storage unit 30) that dictates how resources should be defined based on their characteristics or the like.

It should be appreciated that the teachings of the present invention could be offered as a business method on a subscription or fee basis. For example, computer system 12 and/or access control system 32 of FIG. 1 could be created, supported, maintained and/or deployed by a service provider that offers the functions described herein for customers. That is, a service provider could offer to control access for computer-based resources as described above.

It should also be understood that the present invention can be realized in hardware, software, a propagated signal, or any combination thereof. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of access control system 32 of FIG. 1 is intended to be illustrative only. Moreover, the depiction of resources 16 in tree 60 being dynamic object spaces (e.g., folders, documents, etc.) is intended to be illustrative only. To this extent, the teachings recited herein could be applied to any type of computer-based resource such as hardware and/or software components within a computer infrastructure. In addition, the present invention could provide an inverse inheritance model whereby a special generic action called traverse can be activated for specific types of nodes within tree 60. In such a case, the definition of role type instances would be extended to additionally contain all permissions that result from building the Cartesian Product of the nodes contained in the path from the domain root node to the root of tree 60 with a singleton set containing only the single action.

We claim:

1. An inherited role-based access control system, comprising:
   a role definition system for defining a set of permissible actions for a role type;
   a role binding system for binding the role type to a node of a hierarchical tree of nodes, wherein the nodes represent computer-based resources, wherein the computer-based resources comprise at least one of hardware and software components of a computer system, and wherein instances of the role type are automatically inherited by hierarchical descendants of the node once the role type is bound to the node;
   a role blocking system for establishing a role type block for the role type, wherein the role type block assigned to the node limits inheritance of the instances of the role type so that the instances are not automatically inherited by the hierarchical descendants of the node; and
   a resource definition system for identifying virtual computer-based resources that are subject to the role binding system and for identifying private computer-based resources that are not subject to the role binding system.

2. The system of claim 1, wherein the role blocking system comprises an inheritance blocking system for establishing an inheritance block on one of the hierarchical descendants, wherein instances of the role type cannot be inherited by the one hierarchical descendant on which the inheritance block has been established or by any descendant nodes of the one hierarchical descendant on which the inheritance block has been established.

3. The system of claim 1, wherein the role blocking system comprises a propagation blocking system for establishing a propagation block on one of the hierarchical descendants for the role type, wherein the instances of the role type cannot be inherited by any descendant nodes of the one hierarchical descendant on which the propagation block has been established.

4. The system of claim 1, further comprising a role association system for associating the role type with particular types of the computer-based resources, wherein the role type can only be bound to the nodes that correspond to the types of computer-based resources with which the role type was associated.

5. The system of claim 1, wherein the binding of the role type to the node results in a role-based domain that comprises the node and the hierarchical descendants of the node unless a role type block has been established.

6. The system of claim 1, wherein the computer-based resources comprise dynamic object spaces.

7. The system of claim 1, wherein the set of permissible actions are derived from a set of generic actions.

8. An inherited role-based access control method, comprising:
   providing a hierarchical tree of nodes, wherein the nodes represent computer-based resources, wherein the computer-based resources comprise at least one of hardware and software components of a computer system;

binding a role type to a node of the hierarchical tree to create a role-based domain, wherein instances of the role type are automatically inherited by hierarchical descendants of the node once the role type is bound to the node;

establishing a role type block for the role type, wherein the role type block assigned to the node limits inheritance of the instances of the role type so that the instances of the role type are not automatically inherited by the hierarchical descendants of the node;

defining virtual computer-based resources whose corresponding nodes are subject to the binding step; and defining private computer-based resources whose corresponding nodes are not subject to the binding step.

9. The method of claim 8, wherein the role type block is an inheritance block established on one of the hierarchical descendants that prevents the instances of the role type from being inherited by the one hierarchical descendant.

10. The method of claim 8, wherein the role type block is a propagation block established on one of the hierarchical descendants that prevents the instances of the role types from being inherited by descendant nodes of the one hierarchical descendant.

11. The method of claim 8, further comprising defining a set of permissible actions for the role type.

12. The method of claim 8, further comprising associating the role type with particular types of resources, wherein the role type can only be bound to the nodes that correspond to the types of resources with which the role type was associated.

13. The method of claim 8, wherein the computer-based resources comprise dynamic object spaces.

14. A program product stored on a recordable storage medium for inherited role-based access control, which when executed, comprises program code for defining a set of permissible actions for a role type;

program code for binding the role type to a node of a hierarchical tree of nodes, wherein the nodes represent computer-based resources, wherein the computer-based resources comprise at least one of hardware and software components of a computer system, and wherein instances of the role type are automatically inherited by hierarchical descendants of the node once the role type is bound to the node;

program code for establishing a role type block for the role type, wherein the role type block assigned to the node limits inheritance of the instances of the role type so that the instances of the role type are not automatically inherited by the hierarchical descendants of the node; and program code for identifying virtual computer-based resources that are subject to the role binding system, and for identifying private computer-based resources that are not subject to the role binding system.

15. The program product of claim 14, wherein the program code for establishing comprises program code for establishing an inheritance block on one of the hierarchical descendants, wherein instances of the role type cannot be inherited by the one hierarchical descendant on which the inheritance block has been established or by any descendant nodes of the one hierarchical descendant on which the inheritance block has been established.

16. The program product of claim 14, wherein the program code for establishing comprises program code for establishing a propagation block on one of the hierarchical descendants for the role type, wherein the instances of the role type cannot be inherited by any descendant nodes of the one hierarchical descendant on which the propagation block has been established.

17. The program product of claim 14, further comprising program code for associating the role type with particular types of the computer-based resources, wherein the role type can only be bound to the nodes that correspond to the types of computer-based resources with which the role type was associated.

18. The program product of claim 14, wherein the binding of the role to the node results in a role-based domain that comprises the node and the hierarchical descendants of the node unless a role type block has been established.

19. The program product of claim 14, wherein the computer-based resources comprise dynamic object spaces.

20. The program product of claim 14, wherein the set of permissible actions are derived from a set of generic actions.

21. A system for deploying an application for inherited role-based access control comprising:

a computer infrastructure being operable to:

define a set of permissible actions for a role type;

bind the role type to a node of a hierarchical tree of nodes, wherein the nodes represent computer-based resources, wherein the computer-based resources comprise at least one of hardware and software components of a computer system, and wherein instances of the role type are automatically inherited by hierarchical descendants of the node once the role type is bound to the node;

establish a role type block for the role type, wherein the role type block assigned to the node limits inheritance of the instances of the role type so that the instances of the role type are not automatically inherited by the hierarchical descendants of the node; and define virtual computer-based resources whose corresponding nodes are subject to the binding step; and define private computer-based resources whose corresponding nodes are not subject to the binding step.

* * * * *